April 28, 1964 W. E. GILL 3,130,477
ROLLER BURNISHING TOOL WITH RELEASE-SPRING ADJUSTMENT
Filed Jan. 23, 1961
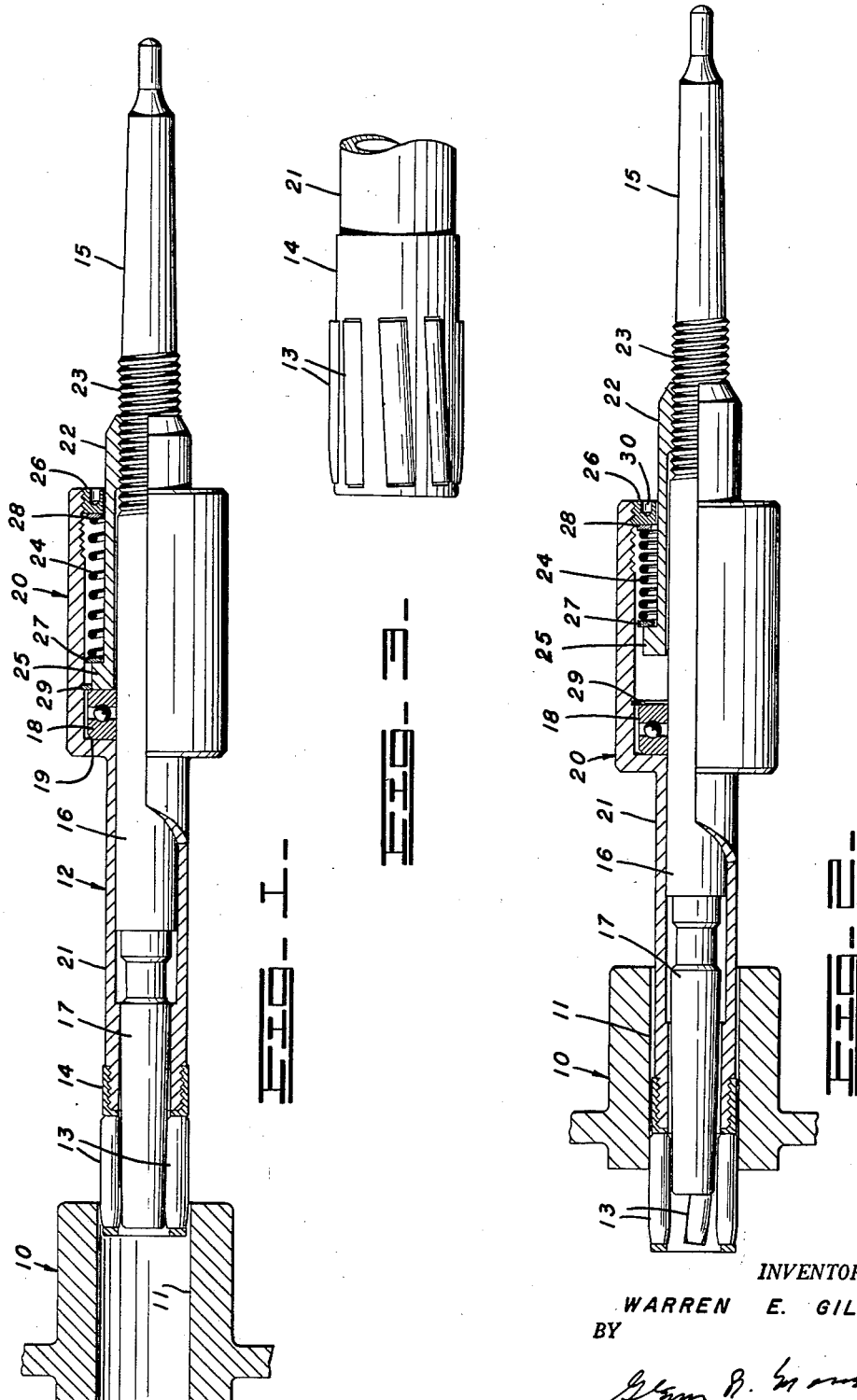
INVENTOR:
WARREN E. GILL
BY United States Patent Office 3,130,477
Patented Apr. 28, 1964

3,130,477
ROLLER BURNISHING TOOL WITH RELEASE-SPRING ADJUSTMENT
Warren E. Gill, Spring Lake, Mich.
Filed Jan. 23, 1961, Ser. No. 84,298
5 Claims. (Cl. 29—90)

This invention relates to the construction of roller burnishing tools. These devices are driven by rotary spindle machinery, and are used to finish cylindrical surfaces on inside or outside diameters of work pieces. The purpose of this operation may be to control size to great accuracy, to create a high finish, or to produce a surface of increased hardness due to cold-working.

Roller burnishing tools are not broadly new, and function by the action of a planetary group of rollers forced into engagement with a work piece under great pressure. To operate on an inside diameter on a work piece, the rollers roll on the outside diameter of a mandrel. When the device is operating on an outside diameter on a work piece, the rollers are surrounded by a heavy ring. The rollers are tapered, and the mandrel is oppositely tapered with respect to the rollers. In the case of the ring, the taper is in the same direction as the roller taper. It is conventional practice to skew the rollers with respect to the axis of rotation of the tool to cause the rollers to move along a helical path on the surface of the mandrel or ring, tending to move the rollers toward a position of maximum engagement with the work piece. A stop normally limits the relative axial movement of the roller group with respect to the tapered member in order to predetermine the operating diameter.

The direction of helical movement of the rollers also creates a self-feeding tendency pulling the tool along with the axial movement of the rollers. If the axial movement of the mandrel or ring is arrested, the rollers tend to continue to move along the surface of the work piece, and thereby proceed on the tapered member to a position of decreased pressure. This action permits withdrawal of the tool, and involves relative axial movement of the roller cage with respect to the mandrel or ring. Such movement takes place normally against the action of a spring.

This spring has been a source of considerable difficulty in the operation of roller burnishing tools. To begin with, it is usually desirable to select a given spring force and rate to correspond to a particular job operation. Once the spring has been selected, a long period of usage will often modify the inital spring force to the point where the tool does not function quite as it should. An excessive spring force will tend to interfere with the self-releasing operation of the tool outlined above, and a spring force which is too small will result in inadequate re-positioning of the tool for engagement with the next work piece. Additionally, the spring tends to assist in the positive maintenance of the relative axial position of the rollers and the mandrel or ring producing the finished diameter at which the tool is operating. Any deviation from this final position (induced by the self-feeding tendency) will result in variation of the diameter produced by the tool on the work piece.

The present invention removes the necessity of changing the spring every time the tool is adapted for a particular job, and also makes it possible to adjust the spring tension as the job progresses through the total run of the work pieces. The structure that provides this spring adjustment for the form of the tool adapted to engage inside diameters is also arranged to provide a one-piece outer housing which serves the function of positioning the roller cage, thus simplifying the assembly and reducing the number of parts which must be manufactured and assembled to close tolerances. The several features of the invention will be analyzed in further detail through a discussion of the particular embodiment illustrated in the accompanying drawing. In the drawing:

FIGURE 1 presents a sectional elevation of a roller burnishing tool about to enter an inside diameter in a work piece.

FIGURE 2 presents a sectional elevation of the same tool and work piece shown in FIGURE 1, but with the inside diameter of the work piece fully processed by the tool. The tool is in the "release" position.

FIGURE 3 presents a fragmentary view on an enlarged scale of the roller group shown in FIGURE 1.

Referring to the drawing, the work piece 10 is essentially a wheel having a hub with an inside diameter 11. The purpose of the operation involving the roller burnishing tool 12 is usually to closely regulate the size and finish of the surface of the bore 11, as well as to apply an increased hardness through cold-working by the rollers 13. These rollers are positioned in an annular group by a cage member 14, and the slots in the cage member receiving the rollers are disposed to place the rollers in a skewed relationship with respect to the axis of rotation of the tool 12. The tool is normally driven by a drill press, lathe, or some other spindle-type machine which engages the tapered end 15 in a conventional manner. The driving end 15 is either formed integrally with, or is connected to, the spindle 16; and this, in turn, is connected to the hardened tapered mandrel 17 which positions the rollers 13 radially with respect to the axis of rotation of the tool 12. It must be noted that the mandrel 17 is tapered in the direction such that the minor diameter is to the left in FIGURE 1, and the rollers 13 are oppositely tapered (with the minor diameter at the right end). The skewed position of the rollers will result in a tendency for the rollers to move along a helical path with respect to the mandrel as the mandrel is driven in the usual direction of rotation at the end 15. The further the rollers 13 move to the right with respect to the tapered mandrel 17, the larger will be the operating diameter of the tool.

This movement of the rollers with respect to the mandrel as the machine operates is limited by the presence of the thrust bearing 18 acting against the shoulder 19 at the inner extremity of the portion 20 of the housing, which also includes the extension 21 directly connected by screw threads to the cage 14. The forces determining the axial movement of the rollers are transferred through the extension 21 and the thrust bearing 18, and through the adjusting nut 22 to the point of threaded engagement of this nut with the spindle 16 at the threads 23. Adjustment of this nut will alter the axial position of the point at which the rollers are prevented from further movement toward the major diameter of the mandrel 17.

In the free position of the tool (prior to the engagement with the work piece) the rollers are maintained in this position of maximum operating diameter by the action of the spring 24, which acts between the shoulder 25 of the adjusting nut 22 and the ring nut 26 which functions as an adjustable spring seat in threaded engagement with the housing 20. If desired, bearing rings as shown at 27 and 28 may be used at the opposite ends of the spring 24. Adjustment of the axial position of the ring nut 26 with respect to the housing 20 will result in compressing the spring 24 in its initial position shown in FIGURE 1, and thereby increasing the spring force tending to hold the housing 20 to the right, with the thrust bearing 18 resting solidly against the shoulder 25 of the adjusting nut 22.

Referring to FIGURE 2, the tool has come to a position in which the rollers 13 have proceeded axially to the point where the principal operating diameter established by the rollers has moved completely through the bore 11. During the progress of the rollers through the bore, the same movement which tends to move the rollers to the right with respect to the spindle 17 will create a tendency to move the rollers to the opposite direction through the bore 11. This action is accompanied by some degree of slippage of the rollers with respect to the spindle 17, since the operation of the tool involves a purely rotative movement of the rollers about the spindle as a result of the prevention of further axial movement by the thrust bearing 18. Prior to the position shown in FIGURE 2, the axial movement of the tool has been arrested by a suitable stop on the machine (not shown) which engages the tapered driving end 15. The rollers 13, however, continue their movement to the position shown in FIGURE 2 as the machine continues its rotation. This action has moved the rollers 13 to a position on the spindle 17 where the pressure against the inside diameter 11 has been decreased. The tool may now be withdrawn easily to the right, even though rotation continues. As the rollers 13 assumed the position as shown in FIGURE 2, this relative axial movement has resulted in the compression of the spring 24 as the thrust bearing 18 is carried away from the shoulder 25 of the adjusting nut 22. It is preferable to maintain the position of the thrust bearing 18 with the ring shown at 29.

The withdrawal of the tool to the right will be influenced by the strength of spring 24 in the compressed position shown in FIGURE 2. This force should be no more than necessary to properly position the rollers with respect to the mandrel, and may be adjusted by manipulation of the ring nut 26. The adjustment of the ring 26 is facilitated providing a group of recesses 30 which can be engaged by a spanner wrench.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A burnishing tool comprising: a driving spindle having a driving and a threaded portion at one end and a conical portion at the other end; a burnishing element assembly including a plurality of burnishing elements surrounding said conical portion and a cage member positioning said elements axially and peripherally with respect to said spindle; an elongated nut axially adjustable along said threaded portion; a tubular housing surrounding said spindle and having one end connected to said cage, said housing having at the other end thereof an expanded interior portion having a bottom and seating a thrust bearing means on said bottom, said elongated nut having a portion partially contained within said expanded portion and having a remaining portion extending axially therefrom at said other end thereof, and means biasing said bearing between said nut and said bottom.

2. The device of claim 1 wherein the nut has a flanged portion adjacent the bearing and wherein the biasing means comprises a retainer ring adjustably engaging the expanded portion at the other end of said portion and including a spring between said flange and said ring.

3. The device of claim 2 wherein said ring is in adjustably threaded engagement within said expanded portion.

4. The device of claim 3 wherein the burnishing elements are rollers that taper to a reduced diameter toward the major diameter of the conical portion.

5. The device of claim 4 wherein the spring means is a coil spring surrounding the nut and wherein the retainer ring also surrounds said nut and closes an opening of the expanded interior portion between the extended nut portion and the walls of the said interior portion.

References Cited in the file of this patent
UNITED STATES PATENTS

| | | |
|---|---|---|
| 705,738 | Davis | July 29, 1902 |
| 1,111,482 | Massmann | Sept. 22, 1914 |
| 1,506,988 | Mirfield | Sept. 2, 1924 |
| 1,683,044 | Mongeau | Sept. 4, 1928 |
| 1,717,720 | Martin | June 18, 1929 |
| 2,040,440 | Moupin | May 12, 1936 |
| 2,069,099 | Seatterthwaite | Jan. 26, 1937 |

FOREIGN PATENTS

| | | |
|---|---|---|
| 125,116 | U.S.S.R. | Apr. 25, 1957 |
| 126,708 | U.S.S.R. | May 14, 1959 |